United States Patent
Hazard

[19]
[11] Patent Number: 5,089,959
[45] Date of Patent: Feb. 18, 1992

[54] METHOD AND SYSTEM FOR MANAGEMENT OF AN ELECTRONIC MEMORY REPRESENTING PREDETERMINED HOMOGENEOUS UNITS

[75] Inventor: Michel Hazard, Mareil-Sur-Mauldre, France

[73] Assignee: Bull S.A., Paris, France

[21] Appl. No.: 380,015

[22] Filed: Jul. 14, 1989

[30] Foreign Application Priority Data

Jul. 19, 1988 [FR] France .................. 88 09698

[51] Int. Cl.$^5$ ................................. G06K 5/00
[52] U.S. Cl. ........................ 364/406; 235/379; 235/375; 235/380
[58] Field of Search .............. 364/406; 235/380, 379, 235/375

[56] References Cited

U.S. PATENT DOCUMENTS

| | | | |
|---|---|---|---|
| 4,001,550 | 1/1977 | Schatz | 235/379 |
| 4,204,113 | 5/1980 | Giraud et al. | 235/375 |
| 4,256,955 | 3/1981 | Giraud et al. | 235/380 |
| 4,367,402 | 1/1983 | Giraud et al. | 235/385 |
| 4,804,825 | 2/1989 | Bitoh | 235/380 |
| 4,822,984 | 4/1989 | Remery et al. | 235/375 |
| 4,864,110 | 9/1989 | Guillou | 235/380 |

*Primary Examiner*—Jerry Smith
*Assistant Examiner*—Russell E. Cass
*Attorney, Agent, or Firm*—Kerkam, Stowell, Kondracki & Clarke

[57] ABSTRACT

The invention relates to a method for management of an electronic memory representing predetermined homogenous units, of the generic type comprising inscribing in memory a stop indicating the balance at the end of a transaction. In this method, the memory is divided into elements including a non-specific number of cells, and at the time of a transaction, the search for the stop is performed by determining at the outset the element in which it is located, and then the precise position that it occupies in this element. A new stop is then inscribed starting at the position of this previous stop, and then this previous stop is neutralized so that it will be ignored in later transactions. The invention is applicable to electronic payment devices.

59 Claims, 5 Drawing Sheets

| Adresses | C1 | C2 | C3 | ------- | Ck | |
|---|---|---|---|---|---|---|
| T1 | 0 | 0 | 0 | ------- | 0 | — E11 |
| T2 | 0 | 1 | 0 | ------- | 1 | — E12 |
| T3 | 0 | 0 | 0 | ------- | 0 | — E13 |
| ... | | | | | | |
| Tn-1 | — | — | — | — | — | — E1n-1 |
| Tn | — | — | — | — | — | — E1n |
| N1 | 0 | 0 | 0 | ------- | 0 | — E21 |
| N2 | 0 | 0 | 0 | ------- | 1 | — E22 |
| N3 | 0 | 0 | 0 | ------- | 0 | — E23 |
| ... | | | | | | |
| Nn-1 | — | — | — | — | — | — E2n-1 |
| Nn | — | — | — | — | — | — E2n |

Z1 brackets rows T1–Tn; Z2 brackets rows N1–Nn.

FIG.1

| T1 | | | | | | | | T2 | | | | | | | | T3 | | | | | | | | T4 | | | | | | | | |
|---|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | ← Z1 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | ← Z2 |
| N1 | | | | | | | | N2 | | | | | | | | N3 | | | | | | | | N4 | | | | | | | | |

FIG.3

| Adresses | C1 | C2 | C3 | -------- | Ck |
|---|---|---|---|---|---|
| A 1 | 0 | 0 | 0 | -------- | 0 | ⟵ E11
| A 2 | 0 | 0 | 0 | -------- | 0 | ⟵ E21
| A 3 | 0 | 1 | 0 | -------- | 1 | ⟵ E12
| A 4 | 0 | 0 | 0 | -------- | 1 | ⟵ E22
| A f-1 | — | — | — | -------- | — | ⟵ E1n
| A f | — | — | — | -------- | — | ⟵ E2n

METHOD AND SYSTEM FOR MANAGEMENT OF AN ELECTRONIC MEMORY REPRESENTING PREDETERMINED HOMOGENEOUS UNITS

FIELD OF THE INVENTION

The invention relates to a method for management of an electronic memory the contents of which represent predetermined homogeneous units, and to a system for performing the method.

BACKGROUND OF THE INVENTION

Electronic systems are known that include a memory the contents of which are representative of predetermined homogenous units and which perform particular methods for the management of the memory. For example, electronic payment systems using a memory card are known. In such systems, at least one zone of the card memory is intended for entering the transactions into the account, or memorizing them, so they can be paid. Elementary cells of the zone then represent the homogeneous payment units, and either the card can be prepaid—that is, the allocated credit depends on a sum of money effectively paid in advance—or the consumption of units may be used to prepare a later bill. It is understood that the example of payment systems is in no way limiting, and other applications have already been conceived of. Such a memory can thus be used in entering any kind of transactions, not necessarily involving compensation in the form of payment.

In such systems, the memory zone used for bookkeeping entry is generally an electrically programmable memory (or EPROM), and for each accounting operation the management unit of the memory modifies the structure of the memory by "grilling" or modifying at least one cell of the zone.

In the earliest designs for payment systems using an electronic memory, the initial credit was represented by a number of unmodified cells of the zone, and each transaction was accompanied by modifying of one cell of the zone as follows: reading of the available elements in the zone of memory allocated to the transactions was performed in one direction, and writing (inscription, or modifying) in another direction. When read, the credit limit was found when the management system detected the first grilled cell it encountered. Before a first transaction, by convention, it was assumed that a first modified cell was located at the end of the zone. At the time of a transaction, the system was positioned just before the first modified cell encountered in the reading operation, and it counted out the number of units corresponding to the transaction, and then modified the last cell counted. Thus when the various transactions related to a plurality of units, some unmodified cells remained between the first modified cell encountered at the time of reading and the end of the zone. These first systems had the major disadvantage of not being rechargeable; that is, once the credit had been exhausted, the memory could not be re-used.

To overcome these disadvantages, methods of memory management have been conceived that permit recharging, or in other words the allocation of new units when the initial credit is exhausted or nearly exhausted. Thus in the case of memory card payment systems, a possible allocation of new credit has been conceived of.

Recharging, or allocation of new credit, comprises making at least some of the cells usable that are located past the first modified cell encountered in reading. To do so, methods and systems have been designed that make it possible, at the time of reading, to ignore the cells modified in previous transactions. To this end, at the time of the transaction, generally an intervention is made at a cell which is modified, and upon recharging, an intervention is made by modifying another cell paired with the first one; depending on the state, this indicates whether the first cell is the effective credit limit, or whether it must be ignored since recharging has taken place. Methods and systems based on this principle are known from European Patent Application No. 022 75 32 and French Patent Application 2 605 431.

In the European application, the memory intended or entry of units is divided into two zones of equal capacity; a first zone is the payment zone, and the second is the recharging zone. At the outset, when the memory is blank, all the binary cells are in a predetermined logical state, for instance corresponding to logical "1". The allocation of an initial credit of N units, if N is less than the capacity of the memory, comprises modifying the $N+1$th cell encountered in reading in the recharging zone, starting at the beginning of that zone, such that a pair (A, B) of cells of binary value (1, 0) comprises a stop; A is the cell having the rank $N+1$ in the payment zone, and B is the cell of rank $N+1$ in the recharging zone. When a transaction necessitates debiting of units, then starting at the beginning of the zones, as many pairs are counted as there are units to be debited, and the state of the last cell counted in the payment zone is modified, without changing the state of the corresponding cell of the recharging zone.

The next time there is a transaction, a search for the last cell modified in the payment zone is made, and from that cell toward the stop, as many pairs are counted as there are units to be debited. It will be understood that in every case, if the transaction involves a greater number of units than there are units available, the transaction is denied.

At the time of recharging, the management unit begins by entering the balance on the card at the moment of the recharging order; that is, the number of pairs in their original state located between the last pair modified and the initially placed stop is entered. Then, starting again at the beginning of the zones, the management unit places a new stop, once a number of intact pairs equal to the amount to be recharged plus the balance is counted. The stop is accomplished with the pair having the next higher rank than the result of the addition. Following this creation of a new stop, the unmodified cell of all the pairs that had a modified cell between the creation of the previous stop and the creation of the present stop, that is, the pairs corresponding to the old stop and to the prior transactions, is modified in turn, in such a manner that later operations ignore these pairs.

This method has various disadvantages in terms of its implementation.

On the one hand, the difference in constitution between the pairs indicating the stop and the pairs indicating the various transactions that have taken place necessitates having a relatively complicated exploitation system, since each pair can assume four different possible configurations: the state 1, 1 corresponding to an available unit; the state 0, 1 corresponding to a transaction; the state 1, 0 corresponding to a stop; and finally the state 0, 0 corresponding to a pair to be ignored. On the other hand, at the time of the transaction, all the memory must be read at least one more time, element by element, as far as the stop, in order to mark the position of the pair inscribed at the time of the last transaction. Finally, recharging is relatively complicated, since after a new stop has been put into position, the entire memory zone located between the new stop and the beginning of the zone must be reread, on the one hand in order to neutralize the previous stop and on the other to neutralize the pairs modified at the time of the series of earlier transactions.

The invention described in French Patent Application 2 605 431 makes it possible to partially overcome these disadvantages, since there is no difference between the stop and the writing done at the time of the transactions. Before a transaction, the exploitation system looks for the stop placed beforehand and creates a new stop toward the beginning of the zone. The memory includes a single zone comprising elements each having an address and an even number of cells. When the memory is in its initial state, it is said that each element is even; when it includes an odd number of cells in their initial state, the element is said to be odd; when all the cells have been modified, then the element is said to be neutral.

The positioning of a stop comprises making a formerly even element odd, by changing the state of one of its cells, while recharging comprises making odd elements available by making them even again, while ignoring elements no longer having any modifiable cell.

Before each transaction, the balance is determined by the number of even, non-neutral elements encountered before the stop, which accordingly is the first odd element encountered in reading.

This method has the major disadvantage that searching for the last stop before each transaction necessitates reading cell by cell from the beginning of the memory in order to determine the parity of each element, since the stop comprises the first odd element encountered in reading.

Moreover, the same element that initially contained an even number of cells greater than two, for example four, six or more, can be used for several transactions after recharging, which makes management considerably more complicated. In effect, recharging comprises creating a new stop toward the bottom of the memory, and then making the odd elements between the last stop before recharging and the new stop to be created (that is, all the elements that had been modified in the last series of transactions before recharging) available, or in other words making them even; moreover, the creation of the new stop must take into account the fact that some of these elements that were made odd, including the last stop, are likely to become neutral, while others are once again usable.

Hence on the one hand it is necessary to enter the number of reusable elements precisely; on the other, the parity of all the elements encountered from the beginning of the zone must be determined by reading cell by cell, which considerably increases the processing time. Moreover, as in the other method in the prior art, a large number of cells must be modified at the time of recharging, which entails not-insignificant risks of error, and loss of money in the case of devices used for payment.

SUMMARY OF THE INVENTION

The subject of the invention is a method, and a system for performing it, in which the management is simplified and which is fast by comparison with the methods and systems of the prior art and in which there is less risk of error.

According to the invention, a method for management of an electronic memory representing predetermined homogeneous units, comprising writing into memory a stop indicating the balance at the end of a transaction involving a credit or debit of units, is characterized in that it comprises dividing the memory into two identical series of elements all having the same format, each element containing a non-unitary number of cells, i.e. more than one cell, each element of the first series being paired with one element of the second series, and one cell of one element of the first series being paired with a predetermined cell of the corresponding element of the second series, each pair of cells thus constituted forming one transaction unit, and in that at the time of a transaction, on the one hand a new stop is constituted by modifying the state of one cell of one element of one of the series, while leaving the corresponding cell of the other series intact, and on the other hand, the previous stop is neutralized by modifying the state of the cell not modified at the time of the creation of the previous stop, and that the search for the position of the previous stop that makes it possible to determine the placement of the new stop is performed by first seeking the element in which the previous stop is located, by traversing the memory element by element, then next seeking the rank occupied by that stop in the element in which it has been detected.

The invention is particularly advantageous in that it permits considerable savings in time in processing transactions, while offering great security compared with the systems of the prior art. At the time of a transaction, the search for the previous stop is no longer performed by reading the memory cell by cell but rather element by element, making current systems, which generally include processing units, capable of working faster in a given non-specific format rather than cell by cell. Reading cell by cell is done solely in one pair of elements in which the possible presence of the stop has been detected. Moreover, at the time of recharging, it is no longer necessary to neutralize the stops created at the time of the various transactions performed since the previous recharging, since the neutralization of a stop takes place just after the creation of the following stop, which increases the security of the operations, because each operation is no longer accompanied by the modification of two cells, one cell in a series of elements to create the new stop, and one cell in the other series to neutralize the transaction unit comprising the previous stop. This further lessens the risk of error and hence the risk of losing units.

The systems of the prior art necessitated neutralizing one cell in each transaction unit that had been modified since the last recharging, which increased the risk of errors, particularly in the case where for technical reasons it was impossible to modify one of the cells. Additionally, neutralization required perfect knowledge of the memory state (by rereading, for example), which complicated the operations.

Further characteristics and advantages of the invention will become apparent from the ensuing detailed description, taken in conjunction with the drawings.

BRIEF DESCRIPTION OF THE DRAWINGS

FIGS. 1 and 2 show two possible variants for the organization of the memory of a system for implementing the method of the invention; and FIGS. 3–19 show various configurations that may be assumed by the memory zone reserved for entering the predetermined homogeneous units in the various functional phases (transaction or recharging).

DESCRIPTION OF THE PREFERRED EMBODIMENTS

Figure 6:
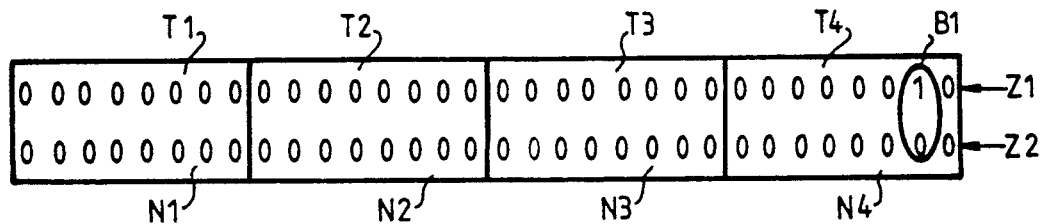

In the variant illustrated by FIG. 1, the two series Z1, Z2 of elements include the same number n of elements each having the same non-specific number k of cells (C1, C2, ..., Ck).

The first series Z1 for example contains the elements E11, E12, ..., E1n, in which one cell is modified to create the new stop at the time of a transaction, and the second series Z2 then contains the elements E21, E22, ..., E2n, which include the cells one of which has been modified after a transaction, to neutralize the previous stop.

Each element can be located in memory by its address, for example T1, T2, ..., Tn for the elements of the first series, and N1, N2, ..., Nn for the elements of the second series. Additionally, one element of the first series is paired with one element of the second; in this example, the element E11, having the address T1, of the first series is paired with the element E21 having the address N1 of the second, and so forth, up to the element E1n, of address Tn of the first series, which is paired with the element E2n of address Nn of the second.

Moreover, each cell of one element of the first series is paired with a predetermined cell of the corresponding element in the second series. Hence each pair of cells thus constituted forms one transaction unit. In one embodiment of the invention, the management of the memory is performed via a processing unit structured around a microprocessor, and to facilitate the task of the microprocessor, one cell of one element of series is paired with the cell having the identical weight in the corresponding element of the other series.

The above description with respect to FIG. 1 of the relative disposition of the elements with respect to one another has been made solely to facilitate comprehension of the method according to the invention. It will be understood that a different organization is also conceivable, the only essential aspects being that pairs of elements are constituted, that fast management of the system to reconstitute these pairs of elements is possible, and that each pair of cells comprising one transaction unit can be reconstituted rapidly.

The memory may be organized differently, for example as illustrated in FIG. 2, in which the pairs of elements constituted are in succession in memory, with the first element E11 of the first series being at an address A1 and its counterpart E21 of the second series being at the address A2, the second element E12 of the first series being at the address A3, its counterpart E22 of the second series being at the address A4, and so forth, up to the last element E2n of the second series, which is at an address Af.

Any other intermediate configurations are also conceivable, as long as they have no noticeable deleterious effect on the processing time.

As explained above, all the elements contain the same nonspecific number of memory cells, and the rapidity of the processing time is obtained by reading the memory element by element. In a preferred embodiment of the invention, each element includes a number of cells corresponding to the processing format of the associated management unit. In effect, to be usable, the memory must be associated with a processing or management unit, which as noted above may be a microprocessor. This will be the case, for example, for memory cards functioning like an electronic billfold, or in other words which can be used to make payments. In such a case, the processing format will for example be the 8-bit byte, which corresponds to the typical operating format of microprocessors incorporated in memory cards; each element will then include eight cells.

It is the choice of such a structure that makes possible a considerable savings in processing time, by comparison with the arrangements of the prior art, which because of their configuration required processing to be done cell by cell. Known microprocessors operate more easily on a number of cells corresponding to their operating format, rather than cell by cell, so that in this aspect the invention is particularly advantageous. In the ensuing description, the examples will be illustrated assuming that the operating format of a processing unit associated with the memory is the 8-bit byte, although this is in no way limiting, but does correspond to a currently used format in the field of memory cards, which comprise a particularly important application of the method according to the invention, for use in electronic payment.

In FIG. 3, the original state of a portion of the memory allocated to entering transactions with the aid of predetermined homogeneous units is shown. In order easily to determine the quantity of transaction units available, the elements are arranged in a predetermined order so that the management unit can read them or write upon them by taking this order into account, to avoid accounting errors. Thus for example referring to FIGS. 1 and 3, it can be seen that the elements of the first series Z1 are arranged in order of their increasing addresses, from T1-Tn, and similarly the elements of the second series Z2 are arranged in order of their increasing addresses from N1 to Nn. Moreover, the cell having the highest weight of each element is considered to be the first cell of the element. In the example shown, the highest weight is 7 and the lowest is 0.

At the beginning, all the cells are for example in the logical state of "0", and writing or modifying of a cell causes it to change its state to logical "1". Naturally, this is simply a matter of convention.

Also by convention, the first series Z1 will be called the transaction series, because it is in that series that the cell marking the new stop at the time of a transaction will be inscribed, and the second series Z2 will be called the neutralization series, because it is in that series that the neutralization cell of the previous stops will be inscribed.

Additionally, in reading what was previously written, for the ensuing description the beginning of the first series Z1 will be the cell having the highest weight of the address element T1, and the end of that series will comprise the cell of lowest weight of the address element Tn; the beginning of the second series Z2 will be the cell of highest weight of the address element N1, and its end will be the cell of lowest weight of the address element Nn.

Additionally, by preference, it is assumed that a transaction unit comprises the pair formed by one cell of a given weight in an element of the transaction series, and the cell having the same weight in the corresponding element of the neutralization series. Such a unit is blank, or in other words available for consumption, when both its cells are in their original state, or in this case the "0" state; it comprises a stop when its cell of the transaction zone is in the logical "1" state while its other cell is in its original state; and it is neutralized, or in other words considered to be logically nonexistent, when both its cells have been modified.

Prior to an initial transaction in a system employing the method of the invention, it is necessary on the one hand to reserve a certain quantity of memory or elements for entry of the transactions, that is, to reserve the two series Z1 and Z2, with other zones capable of being used for some other purpose (this reservation may involve the entire memory, it will be remembered). On the other hand, once the reservation has been made, it is necessary to constitute a balance of transaction units, because initially the balance, or in other words the transaction power expressed in units, is zero; contrarily, the system has an accreditive power, that is, a certain number of transaction units that can be used to constitute the balance. Additionally, a transaction will be accompanied by a debit of units up to the limit of the balance, or accreditive units up to the limit of the accreditive power, depending on whether the capacity is being used up or recharged.

In FIGS. 3, 5-19, it has been assumed that the zone allocated to entering the homogeneous units into the account includes 32 transaction units; that is, it comprises four 8-bit bytes in the transaction series and four 8-bit bytes in the neutralization series.

FIG. 3 is an excellent illustration of the correspondence among the cells of each element of the transaction series and the cells of each element of the neutralization series, forming the transaction units.

Initially, it is assumed that the accreditive power equals the number of transaction units reserved in the memory, minus one. In the example chosen, the accreditive power is accordingly 31 transaction units. At the same instant, the balance is zero. Hence no debit is possible, as long as at least one credit operation has not yet been performed.

The assumption that the accreditive power is initially equal to the number of transaction units minus one is particularly advantageous, because this further contributes to saving time in the transactions. It can be confirmed that as long as no credit operation has been performed, all the transaction units are in their original state and are available. Reading of the two series at that moment makes it possible to detect this state. If it were conceded that the accreditive power corresponded to the number of transaction units reserved, that would in turn authorize the assignment of an initial credit in such a manner that the balance prior to a first transaction would correspond to the number of units effectively reserved. Reading of the transaction series and neutralization series would not permit the processing unit to detect whether the memory is in a state corresponding to a maximum accreditive power, or a maximum balance. To enable this detection, another complementary zone of two series Z1, Z2 must then be reserved in the memory in order to check whether a credit operation has already been performed, which would oblige the processing unit to read the especially reserved memory zone, which in turn would increase the processing time and complicate the method to be performed. To simplify the implementation of the method, it is therefore preferable to assume that the accreditive power of the blank memory equals the number of reserved transaction units minus one, so that in the first credit operation, it is possible to create at least one real stop at the last pair of cells located in the last element of the reserved series, which in turn means in other words that the initial balance can at maximum be equal to the number of transaction units reserved, minus one.

The method of the invention is particularly advantageous, as will be demonstrated below, because whether a debit operation or a credit operation is being performed, identical functions are implemented, after having very rapidly performed the search for the stop position. After its precise position has been detected, and in accordance with that position, it may be possible to perform either a debit operation exclusively or a credit operation exclusively, or one or the other of these operations. For example, following the reservation of zones for entering transactions, that is, in the case where a credit operation has not yet taken place, no debit operation is possible; only a credit operation can take place.

It may also happen that the balance is maximum, that is, the stop is detected at the last available transaction unit; in that case, only a debit can take place.

Finally, it may happen that the stop is detected elsewhere than in the zone, and in that case it may be possible to authorize debit or credit operations. In such a case, the denial of a debit or credit operation may be motivated for example by the fact that the operation bears on a transaction involving a number of transaction units greater than the debit or credit authorized.

Thus a debit or credit cannot be authorized unless the state of the memory is compatible with the amount of the intended transaction.

In accordance with the invention, for rapid detection of the position of the stop, the processing device associated with the memory is arranged to perform a logic operation between the contents of each element of the transaction series and its equivalent in the neutralization series. The logic element selected gives a particular result in the case where the stop is detected in a pair of given elements. When a result indicates that the stop is present in one pair of elements, then its precise position in that pair of elements is sought, for example by reading all the cells of the element of that pair, located in the transaction series, until a cell that has been modified with respect to its initial state is found in that element, and then verifying whether the modified cell belongs to the stop or not. It may happen that a modified cell in the first series belongs to the stop or to a neutralized unit.

Merely detecting a modified cell in an element of the first series is accordingly not sufficient to confirm that the cell belongs to the stop. In the case of a stop, the corresponding cell in the element in the second series Z2 is not modified with respect to its original state, while in the case of a neutralized unit the corresponding cell is modified. Hence it must be determined whether the corresponding cell of the corresponding element of the second series is modified or not, in order to know whether the cell belongs to a neutralized unit or to the stop.

In practice, the search for the pair of elements in which the transaction unit corresponding to the stop is located is performed for example by successive comparison, in the order of their increasing addresses, of each element of the transaction series with the corresponding element of the neutralization series.

By comparing the elements of each series which are the constituents of the same pair, it is confirmed in the case where the stop exists that the element of the first series is different from its corresponding element in the second series.

This is the case shown by FIG. 4, with a configuration that the memory can assume at a given moment; in order not to be overloaded, the example shows a memory composed of four pairs of elements, each made up by a set of four cells. The upper part of the drawing shows the contents of the first series Z1, which may correspond to the transaction series; the middle part of the drawing shows the second series Z2, which may be the neutralization series; and the lower part of the drawing shows the results R1-R4 of a comparison to be made upon each pair of elements, which would give a positive result for the elements containing the stop. The pair P1 of elements comprises solely cells in their original state. The pair P2 contains two available transaction units (in the state 0, 0) and two neutralized transaction units (state 1, 1). The pair P3 contains two available transaction units, one neutralized unit and the stop B. The pair P4 contains only neutralized transaction units.

In a particularly advantageous manner of implementation, the comparison between one element of the first series Z1 and its corresponding element in the second series Z2 is performed by applying the EXCLUSIVE OR function between the elements.

In the case where the two elements in question are different, that is, when they contain the stop, then the result of performing the EXCLUSIVE OR between the elements is different from what would appear when the elements contain only the available and/or neutralized transaction units.

Furthermore, simple logical functions such as the EXCLUSIVE OR function are generally available on processing units currently used, such as microprocessors. As explained above, modern processing units have a non-specific operating format, which corresponds for example to the 8-bit byte; that is, it is possible to apply functions such as the EXCLUSIVE OR function between the binary words each of which comprises eight cells. Other formats may be used.

It should now be noted that in operating element by element, considerable time is saved compared with the methods of the prior art, which required operation cell by cell.

It can finally be noted that the EXCLUSIVE OR function is particularly advantageous to use, because it is equally applicable to the case where the original state of the cells is logical "0" and the case where this original state is logical "1".

When a pair of elements containing the stop has been detected, with regard to the comparison between each element of the first series Z1 and the corresponding one in the second series Z2, the precise position of the stop is then sought in that pair of elements, as explained above, by reading all the cells of the element of that pair located in the transaction series Z1, and as soon as a cell of that element is detected to have been modified from its original state, then looking for whether the corresponding cell in the element of that pair in the neutralization series Z2 has been modified or not, in order to determine whether the modified cell in the transaction series belongs to a neutralized transaction unit or to the stop.

In a variant, at each pair of elements having been detected as containing the stop, instead of reading a cell of the neutralization series only when the corresponding cell in the transaction series has been detected as having been modified from its original state, in order to determine whether that cell in the neutralization series has also been modified or not, reading is done in each pair of elements systematically of each cell of the transaction series and its corresponding cell in the neutralization series, until a pair of cells is detected of which the cell in the transaction series has been modified, while that in the neutralization series has not.

While this variant does not make verification any more secure, it may be simpler to implement with certain particular types of processing units.

FIG. 5 shows what a comparison between the corresponding elements of the memory in its original state, as shown in FIG. 3, would yield. In that case, each pair of elements causes a logical result of level "0" to appear. Reading of these results, starting at the beginning of the zone and proceeding until the end, would not make it possible to detect the presence of a stop such that the processing unit would find that the memory is in its original state and only a credit operation, in order to achieve a balance, would be possible. In FIG. 5, the result R1 is the result of comparison between the transaction series element located at address T1 and the corresponding neutralization series element located at the address N1, and so forth, until the result Rn of comparison between the elements at address Tn in the transaction series Z1 and those of address Nn in the neutralization series Z2.

In a practical embodiment, circuits for cell by cell or element by element comparison are easily achieved with standard logic circuits; alternatively, these functions may be realized with the aid of a microprocessor the operating mode of which is adapted to this use. Thus in the case of a memory card including a memory for managing predetermined homogeneous units, for example for payment purposes, and a microprocessor for managing the memory, it will be possible to configure the microprocessor to perform one and/or the other of these functions, depending on the choice that will have been made to determine the position of the stop.

The following description illustrates the various cases that may arise in the course of the life of a system performing the method according to the invention.

As has been noted above, prior to a first credit operation, that is, when the memory zone allocated to accounting contains only cells in their original state, searching for the stop does not permit detecting its presence in any of the elements. The system implementing the method then assumes that a fictitious stop exists, preceding the memory zone allocated to accounting. In that case, only credit is possible, and a credit operation is performed by displacing the fictitious stop at the beginning of the memory zone toward the end, to the limit of the accreditive power. In the particular case of an initial credit, transaction units that have been neutralized are not yet in existence. However, in general, the system must verify that such neutralized stops do not exist, and the positioning of the new stop comprises leaving a number of transaction units available between the old stop, in this case the fictitious stop, and the new stop. Thus in a credit operation involving k units, the management unit counts k available transaction units and positions the stop on the k+1th available unit encountered. The inscription of the stop is performed by modifying the state of the transaction cell of the pair that must comprise the stop. In this particular case of an initial credit, neutralization of the previous stop does not exist, since that stop was fictitious.

FIG. 6 shows the state of a memory containing 32 transaction units distributed among elements comprising 8-bit bytes. The transaction series contains four 8-bit bytes at addresses T1, T2, T3, T4, and the neutralization series likewise contains four 8-bit bytes at addresses N1, N2, N3, N4. The credit has applied to 30 units, and it is confirmed that the stop B1 has been positioned at the 31st transaction unit by modification of the corresponding transaction cell.

In this particular case, the memory is available for debit operations; its balance is 30 transaction units, and its accreditive power is 0, because only one transaction unit remains between the stop B1 created and the end of the zone. As has been explained above, to simplify the billfold management operations this last transaction element cannot serve to comprise anything but a stop, because the existence of a fictitious stop past the end of the zone cannot be taken into consideration, since a different zone of the memory would have to be reserved to indicate to the system that such a fictitious zone existed. This would complicate the management operations, since it would be necessary for the management unit to systematically read the state of this zone indicating whether a fictitious stop existed or not.

Generally, the accreditive power comprises the number of available transaction units minus one that are located between the last stop positioned and the end of the zone.

A debit operation comprises displacing the stop toward the beginning of the memory zone allocated to the entry or accounting of transactions. The first operation performed is the search for the stop, as has been described above, by a comparison of the elements one pair at a time, and then a precise search for its position in the pair of elements in which the stop has been detected.

After the detection of the stop, the debit operation comprises creating a new stop between the previous one and the beginning of the zone. This must be done within the balance limit, taking into account the unit that might have been neutralized during previous operations. As is explained above, the fact that an element has been neutralized translates into the presence of a cell that has been modified from its original state in the series of neutralization elements. Thus to displace the stop, the management unit associated with the memory counts the number of cells of the series of neutralization elements that have not been modified, optionally skipping over those that have been modified; when a number of cells corresponding to the number of units to be debited for the transaction has been counted, the management unit modifies the state of the transaction cell paired with the last cell of the neutralization series that has been counted.

Figure 7:
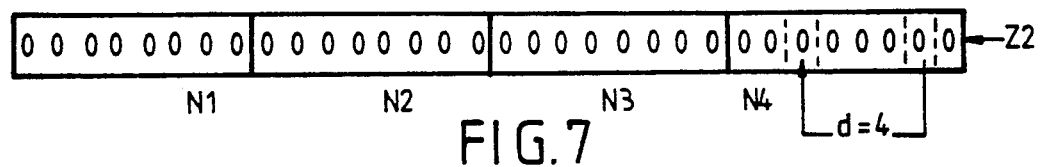
Figure 8:
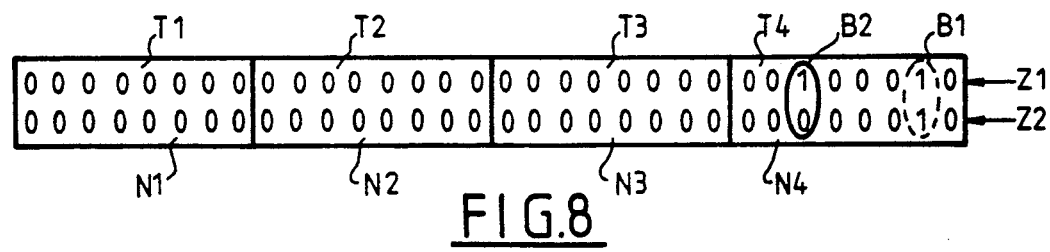

FIG. 7 illustrates this counting in the series of neutralization elements: The management unit counts a number of unmodified cells, starting at the neutralization cell of the last stop, and is aimed at the last cell counted out. In the case shown in FIG. 7, the counting involves four units. Following the creation of the new stop, the management unit modifies the state of the cell located in the neutralization series Z2 of the previous stop, such that after the debit operation and neutralization the memory assumes a configuration as illustrated by FIG. 8. The 31st transaction unit, which corresponded to the previous stop B1, is neutralized, and the 27th transaction unit comprises the new stop B2 following a debit of four units. The balance is now 26 units, and the accreditive power is three units.

Preferably, the system is arranged so that the credit and debit operations cannot be repeated when the number of neutralized units is overly great, which limits the accreditive power and makes the system difficult to use. In that case, either a new memory zone is allocated in another device, or if some available memory zone remains in the system used, then a different zone is reserved to permit entering homogeneous units.

Figure 9:
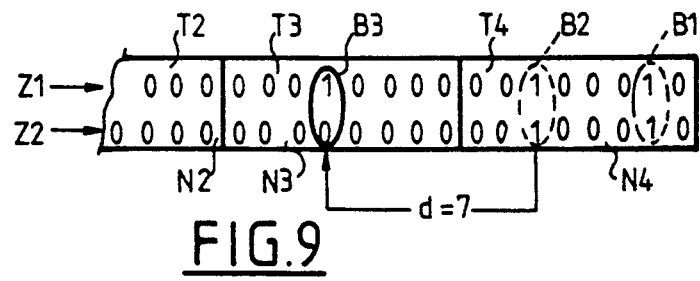

FIG. 9 shows the state of the memory after a new debit of seven units. The search for the position of the new stop B3 is performed by counting the number of unmodified cells of the neutralization series from the previous stop B2. In the special case, since the system is still in a phase where recharging has not taken place, all the cells of the neutralization series that have been encountered in the reading operation since the last stop were in their original state, and no shifting has been done taking into account transaction units that would have been cancelled before. It can also be seen from this drawing figure that the previous stop B2 has been cancelled after the positioning of the new stop (its cells are in the state 1, 1).

Figure 10:
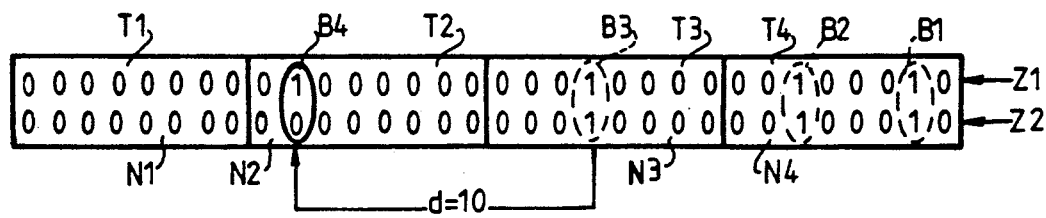

FIG. 10 shows the state of the memory after a new debit, this time involving ten units. Once again, the search for the position of the new stop B4, after detection of the old stop B3, taking into account the number of unmodified cells of the neutralization series located in front of the position of the previous stop B3, has not made it possible to detect modified cells before, which means that the debit is accompanied by the positioning of the new stop B4 at the tenth transaction unit encountered starting at the last stop, in the balance zone. After that operation, the balance is nine units, and the accreditive power is 18 units.

Figure 11:
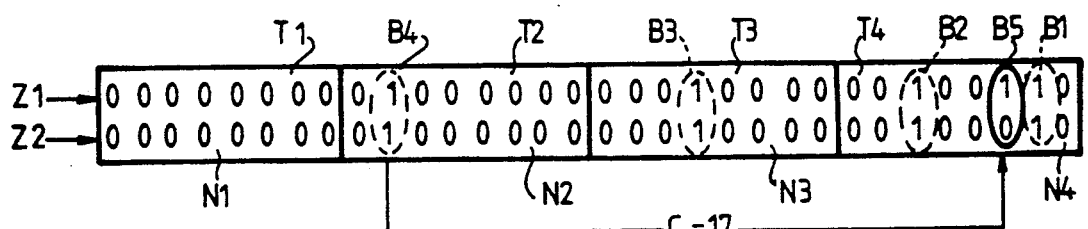

FIG. 11 shows the state of the memory following the above debit operations and has a credit of 17 units.

A first phase has comprised searching for the position of the stop B4. The search has made it possible to determine the address of the element of the neutralization series and the weight of the cell of this series corresponding to the stop B4, in such a manner as to perform the credit operation starting at this stop. As is done for a debit, the credit comprises the bookkeeping entry of the cells of the neutralization series located between the detected stop B4 and the end of this series that were not modified in earlier operations. Each cell of the neutralization series detected as having been modified from its original state signifies the presence of a neutralized and hence unusable transaction element. Crediting comprises leaving as many transaction units free between the previous stop B4 and the new stop B5 as there are units that the credit involves.

In the example shown, the counting of 17 unmodified cells in the neutralization zone had led to encountering two cells modified at the time of the last two debit operations, which are respectively the fourth cell of the neutralization element having the address N3, which was inscribed at the time of neutralization of the stop B3, and the third cell of the neutralization element at address N4 that was neutralized at the time of the next-to-last debit operation (stop B2). The new stop B5 then comprises the sixth cells of the transaction elements of address T4 and of the neutralization elements of address N4.

A credit operation involving 18 units instead of the 17 shown in FIG. 11 would have led to positioning of the stop at the last cells of the elements at address T4 and N4, and a credit greater than 18 units would have been impossible in that case.

After the positioning of the new stop B5, the transaction unit corresponding to the previous stop B4 is cancelled by modifying the state of the neutralization cell of that unit.

Figure 12:
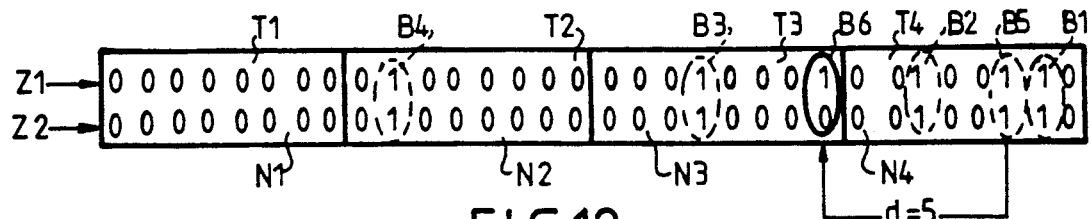

FIG. 12 shows the state of the memory after a new debit of five units following the credit of 17 shown in FIG. 11. The search for the stop ed to detecting the last stop B5 positioned after the credit, and counting of the unmodified neutralization cells between the stop and the beginning of the series, in order to detect the position of the new stop to be positioned, leads to detecting a modified neutralization cell, corresponding to the stop B2, such that the positioning of the new stop B6 has taken this modified cell encountered in the counting into account.

From the above discussion, it can be found that the method according to the invention enables highly transparent operation, because the positioning of a new stop is systematically accompanied by the neutralization of the transaction unit comprising the previous stop, such that especially at the moment of recharging, there is no longer any need, as in the methods of the prior art, to reread the entire memory in order to neutralize the elements used, or to make them available again as in the case of the above-mentioned French patent application. Taking into account the contents of the neutralization series, errors in counting the units to position the new stop are avoided, and the systematic neutralization following the creation of a new stop makes it possible to obtain much faster recharging times, that is, the time necessary for a credit operation, than in the methods of the prior art. A debit or a credit systematically brings about the implementation of the same operations, the only difference being due to the fact that the displacement of the stop in the memory is performed in a different direction. However, although the fact that the transaction units that constituted a stop are neutralized at the time of the creation of the following stop makes it possible to obtain great security at the time of a credit operation without complicated management procedures, a system for implementing the method of the invention still might not function correctly; in particular, it may be impossible to modify the state of a transaction cell at the time of the creation of a new stop, or to modify the state of a neutralization cell at the time the attempt is made to neutralize the previous stop, following the creation of a new stop.

Such kinds of inadequacies may be taken into account to guarantee that there will be no loss whatever of units at the time of transactions, which could be particularly harmful if such a memory is used as an electronic billfold. In that case, malfunctioning of the memory would mean a loss of money.

A first kind of dysfunction that may arise is that it may be impossible to modify the state of the neutralization cell of the previous stop after the creation of a new stop.

Figure 13:
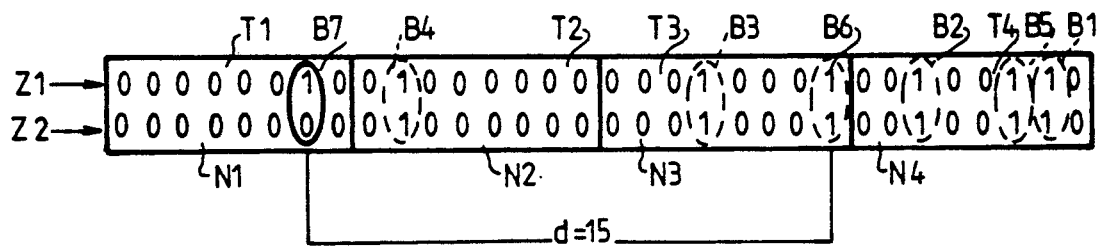

This may happen after a debit operation. In that case, the old stop is located between the new stop and the bottom of the zone assigned to the transactions. This is illustrated by FIG. 13, which shows the previous state of the memory shown in FIG. 12, in which a debit of 15 units is desired. The new stop B7 is now located at the cells of the seventh rank of elements of address T1 and N1, while the previous stop B6 is located at the eighth cells of the elements of address T3 and N3. It is this last stop B6 that is not neutralizable, because its neutralization cell cannot be modified. In that case, it is assumed that the new stop B7 placed in the elements of address T1 and N1 following the debit indicates the current limit of the balance, while the old stop, which is not neutralizable, is accordingly assumed to be the limit of the accreditive power of the memory. In that case, the new balance equals six units, and the accreditive power is reduced to 13 units, while if the stop of the previous transaction B6 could have been cancelled it would have been 17 units.

In such a case, the impossibility of neutralizing the stop corresponding to a previous transaction thus translates into a reduction in the accreditive power of the memory. In fact, it is assumed that the old stop comprises the new bottom or end of the memory.

Figure 14:
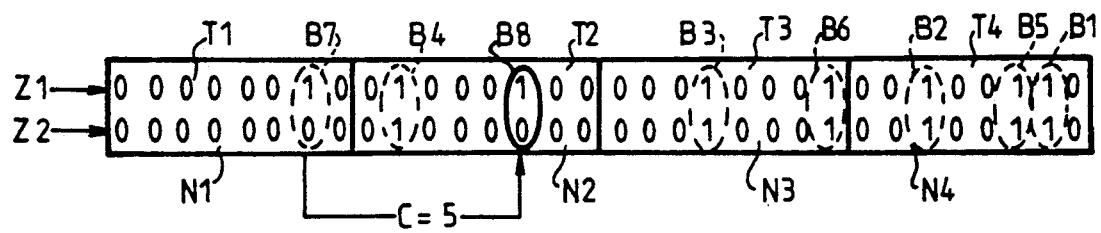

FIG. 14 illustrates the case where it is impossible to neutralize the previous stop after an attempt at credit. The example shown begins at FIG. 13, in which the previous stop B7 was placed at the cells of the seventh rank of the elements having the address T1 and N1. The credit attempt involves five unit, for example, such that the new stop B8, taking into account the neutralized units encountered, is located at the sixth cells of the elements of address T2 and N2. However, in the case where it is impossible to modify the state of the neutralization cell of the previous stop upon a new attempt at credit, the system refuses the attempt, and it is then assumed that the old stop comprises the limit of the memory zone allocated to the transactions, and hence to the accreditive power. In other words, as in the previous case, the old stop which cannot be cancelled becomes the new limit of the reserved zone.

Another kind of dysfunction may comprise the impossibility of modifying the state of a transaction cell. In this case, the transaction must not be refused at any cost, since the balance authorizes such an operation, and the refusal is merely because the memorization function is not performing correctly. To overcome such a disadvantage during the use of a system performing the method of the invention, a securing method has been provided, the principle of which is the same, that is, the impossibility of modifying a transaction cell gives rise to a debit operation or a credit operation.

The principle of this method is to create the stop at the available transaction unit having the next higher rank, toward the bottom of the memory, than that where the stop should have been created. In the case of a debit, a stop shifted past the old stop toward the bottom of the memory cannot be created in any case. In the case of a credit, the possible limit of the shifting will be the bottom of the memory. However, this shifting of the stop, if it is not followed by any other operation, has the effect of increasing the balance by one unit. In order to maintain a correct value for the balance, after the creation of the stop at a shifted rank, one available transaction unit in the balance zone is neutralized, that is, in the portion of the memory allocated to the transactions that is between the beginning of the memory zone, as defined above, and the new stop.

After the creation of the shifted stop and the neutralization of this unit, the previous stop is neutralized.

In the event that it is impossible to neutralize the previous stop, that is, to modify its neutralization cell, then the problem is as discussed above; that is, a reduction in accreditive power is assumed, limited by the previous stop. More precisely, the operation of creating a shifted stop following an impossibility of creating a stop at the pair of cells at which the stop should have been created may be broken down into several phases:

a first phase accordingly comprises determining which transaction unit of the next higher rank than that where the stop should have been created is available;

the second phase comprises modifying the transaction cell of the transaction unit selected, to comprise the shifted stop;

a third phase comprises modifying the neutralization cell of an available unit located in the representative zone of the balance, that is, in the portion of the memory located between its beginning and the new stop created. This makes it possible to compensate for the shifting of the stop and to maintain a balance equivalent to what it should have been;

a fourth phase comprises modifying the transaction cell corresponding to the neutralization cell modified in the third phase, so that the transaction unit that was previously available in the balance zone is completely neutralized, in order to simplify later transactions;

the fifth phase comprises neutralizing the previous stop, by modifying the state of its neutralization element.

It may happen that in performing this method, the transaction cell corresponding to the neutralization cell modified to compensate for the shifting of the new stop cannot be modified in turn. It then follows that in the case where the initial state of the cells for example is the logical state of "0", the transaction unit available in the balance zone, the neutralization cell of which had been modified, then has the following configuration: the transaction cell is in the state of logical "0", and the neutralization cell is in the state of logical "1".

The EXCLUSIVE OR operation that now enables detecting the stop (which it will be recalled has the following configuration: transaction cell in the state of logical "0", and neutralization cell in the state of logical "1") as has been explained above, would cause the memory management system to assume that a difference exists between the transaction element and the corresponding neutralization element, such that it could assume that this difference is due to the presence of a stop. However, in the precise search for the rank of the stop in these elements, the system would detect that the result of comparison between the two elements is due to the fact that this "0, 1" configuration exists, which must be assumed to be different from the configuration "1, 0" effectively indicating the presence of a stop.

Hence, to summarize, when the comparison between one element of the transaction series and its corresponding element in the neutralization series makes it possible to detect a difference, this may be due to the fact that the stop is present in these elements, or that a transaction unit exists, the neutralization cell of which has been modified to compensate for the creation of a shifted stop, and in that case it was impossible to modify the state of the corresponding transaction cell. At the moment of the search for the pair of cells leading to such a result in the comparison, it is suitable to find out whether the transaction cell is the one that was modified, and in that case to assume that a stop is involved, or if it was only the neutralization cell that was modified, then a further search must be made to find the stop.

FIGS. 15-19 illustrate the method described, applied to the impossibility of creating a new stop at the desired placement at the time of a debit operation.

Figure 15:
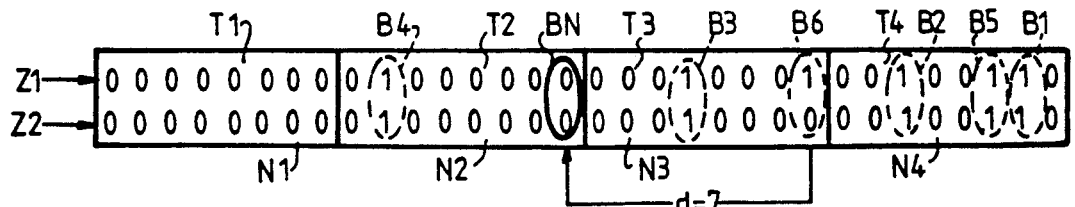
Figure 16:
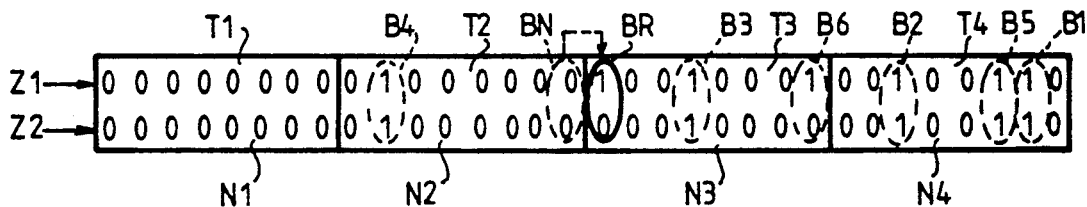
Figure 17:
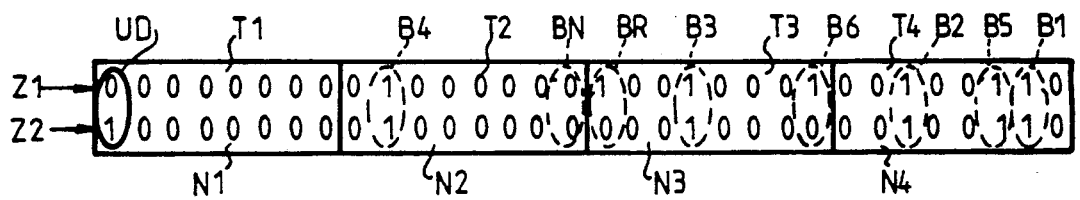

FIG. 15 shows the memory state before this operation. The previous stop B6 in this example comprises the transaction unit located at the eighth rank of elements of address T3 and N3. This is the stop positioned as shown in FIG. 12. Moreover, the fourth cells of the elements of address T3 and N3 are modified with respect to the original state, comprising a neutralized transaction unit (stop B3). The desired debit operation involves seven units, so the new stop BN must be created at the eighth transaction unit, comprising the cells having the eighth rank in the elements of addresses T2 and N2. After the management system associated with the memory has detected the impossibility of modifying the transaction cell that should be modified, it seeks the immediately available transaction unit located between the unit at which the new stop should have been created and the old stop, in the particular case of a debit. In this special case, this available unit comprises the cells of the first rank, of the elements of addresses T3 and N3. The management system then modifies the state of the cell of first rank of the transaction element of address T3, so as to comprise the new stop BR, as shown in FIG. 16.

Next, the management system seeks an available unit UD located in the balance zone, that is, in the example shown in the zone comprising the elements of addresses T1, N1, T2, N2, and then modifies the state of the neutralization cell of one of these available elements. To simplify the processing, in the debit operation, the system is preferably arranged to modify the state of the first available unit UD encountered in the reading from the beginning of the zone. In the special case, the first available unit from the beginning of the zone comprises the cells of first rank of the elements of addresses T1 and N1, such that in this figure shown, the first neutralization cell of the zone of memory allocated to the transactions is the one that is modified.

Figure 18:
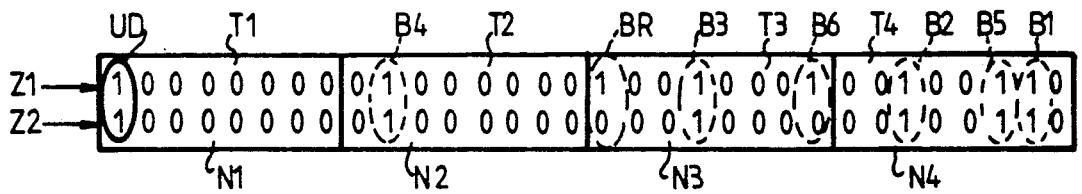

In FIG. 18, the following modification has been shown, which involves the transaction cell corresponding to the neutralization cell modified during the previous phase, that is, in the case illustrated, the first transaction cell encountered in reading the series of transaction elements.

Figure 19:
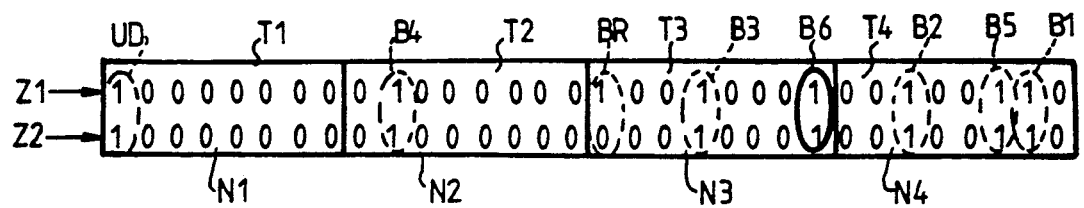

Finally, after this operation, the management system associated with the memory will neutralize the previous stop B6, by modifying the state of its neutralization cell. This is shown in FIG. 19.

By consulting the various drawing figures, it can be found that the balance remaining after these various operations is identical to what should have remained if the transaction had been successful from the beginning, or in other words if it had been possible to comprise the stop at the desired location. Contrarily, the artifice selected to compensate for this impossibility of creating the stop at the desired location simply brings about a reduction in the accreditive power, which is of no special importance in the transaction accounting.

To generalize, it can be seen that the impossibility of making the stop corresponding to a debit of d units leads to effecting a consumption of d - 1 units and then neutralizing one cell in the balance zone.

In parallel, the impossibility of placing a new stop at the time of a credit operation with c units would cause the constitution of the new stop, at a position corresponding to a credit of c+1 units, then the neutralization of a transaction unit left in the balance zone, in order to effect the compensation, and then the neutralization of the previous stop.

In the particular case of credit, the unit neutralized for compensation is selected from among the available transaction units between the previous stop and the new stop. The previous stop is of course located between the beginning of the zone and the new stop, so that the situation is the same for the unit selected to effect the compensation.

The purpose of this artifice is to avoid a loss in the balance in the case where it would be impossible to neutralize the previous stop, which would necessitate refusing the credit operation and assuming that the previous balance was the balance limit, as explained above.

After the refusal of a credit operation, the balance must be the same as before the attempt.

If a transaction unit were neutralized, for the compensation, between the beginning of the zone and the old stop, then in such a case where it is impossible to neutralize the previous stop, followed by a refusal of the transaction, a reduction in the balance would occur, due to the neutralization of the compensation unit, and this reduction would be prejudicial to the user of the device.

As a variant, in the particular case of attempts at credit, it is provided that the neutralization of a transaction unit corresponding to a shift resulting from the impossibility of positioning the new stop at the desired location is performed after the attempt at neutralizing the previous stop has been successful. If it is impossible to neutralize the previous stop, then the credit operation is refused. Contrarily, if it is possible to neutralize the previous stop, then it is possible to select any available transaction unit, located between the beginning of the zone and the new stop, in order to neutralize it, to effect the compensation resulting from the shifting of the new stop.

This variant has the advantage that on the one hand, no useless operation is performed, since the neutralization of available units in order to effect a compensation is performed only if it has been possible to neutralize the previous stop, after the creation of the new stop, and on the other hand, this substantially simplifies the embodiment of a device for performing the method of the invention, because it is unnecessary to take the location of the old stop into account in order to select an available transaction unit in order to neutralize it for the compensation.

It will be understood that it is also possible to select this variant in the case of a dysfunction in an attempt at inscribing a new stop at the time of a debit; that is, th attempt at neutralization of the previous stop is performed before the neutralization of an available transaction unit in the balance zone, in order to effect the compensation.

Preferably, when this second variant is used to overcome the dysfunction at the time of credit attempts, then it is also selected to overcome the dysfunction during debit attempts, in order to simplify the procedures to be implemented in the various cases shown in the drawing.

It is understood that the algebraic sign (+ or −) of the operations depends on the convention selected at the beginning, which comprises constantly referring to the beginning of the zone, and assuming that the increasing order of the cells begins with the first cells of the elements of addresses T1 and A1, ending with the last cells of the elements of addresses T4 and N4 in the example shown. Thus the positive direction is the direction in which the zone is read starting at its beginning. It will be understood that this may be modified without any effect on the results of the transactions.

It may also happen, at the time of a credit or a debit, that it is impossible to create the shifted stop at the selected location, either because in the case where it is impossible to create a stop following a credit operation the shifted position would exceed the limits of the zone—in which case the credit operation would be refused—or because after a shifting order following an impossibility of modifying the state of a transaction cell, it would also be impossible to modify the state of the transaction cell corresponding to the transaction unit selected in order to comprise the shifted stop, for some reason internal to the memory.

In that case, a new order may be given to shift until an available transaction unit is found the transaction cell of which can be modified. In such a case, however, it would be necessary to take into account the various successive shifting orders issued, and to compensate for them, as many transaction units as there has been shifting with respect to the position that the new stop should actually have occupied will have to be neutralized in the balance zone, by implementing one or the other of the two variants explained above.

Likewise, complementarily, it can be assumed that after a predetermined number of successive shifting orders, the credit or debit operation is refused because an excessively large number of unmodifiable cells exists in the memory.

In one implementation mode, it may for instance be assumed that three successive unsuccessful shifts will result in the refusal of the debit or credit operation desired. Additionally, if not enough available cells exist to make the shifted stop and/or to make the compensations, then the transaction is refused.

In conclusion, the invention is particularly advantageous because it uses the same functions whether a transaction bearing on a debit or one bearing on a credit is involved. The systematic neutralization of the transaction units used to comprise the previous stop, at the time of the creation of a new stop following a transaction, makes it possible to save considerable time in processing, especially at the time of credit operations, because it is unnecessary to reread the entire memory to neutralize the transaction units used since the last credit operation.

Moreover, as a complement to the remarkable performance of a device using the method according to the invention, another advantage of the invention is the fact that the user, or the processing system, no longer needs to know the internal configuration of the memory reserved for the transactions, as was the case with the systems and methods of the prior art, which required perfect knowledge of the contents of the memory, in particular at the time of the neutralization operations. Here, all of these operations are completely transparent, and the risks of dysfunction or errors are taken entirely into account.

The search for the element containing the old stop, in order to determine the starting point for counting of the units corresponding to the transaction to be performed, makes possible a considerable time savings, since the memory is not read cell by cell, given that cell-by-cell reading is performed only in the pair of elements in which the stop is detected.

Finally, the dysfunctions that may arise when the method is performed are taken into account, while the prior art makes no provision on this subject at all, so that a system using the method of the invention is particularly sure and reliable; in the case where the system is used as an electronic billfold in particular, the method prevents the loss of money for the holder of a memory card that would be used in this way, or for the entity issuing the money.

A system performing the method of the invention may be based on a microprocessor of typical processing format, for example eight bits, and the memory used for managing the homogeneous units may be a memory of the EPROM type, that is, one in which the contents of one or the other of the cells may be modified a single time by applying an electrical signal.

What is claimed is:

1. A method for management of an electronic memory representing predetermined homogeneous units wherein a stop is written into the memory indicating the balance at the end of a transaction bearing on a credit or debit of units, characterized in that it comprises dividing the memory into two series (Z1, Z2) of elements of equal capacity, each series being divided into elements of the same format, each element containing a non-specific number (k) of cells (C1, C2, ..., Ck), each element of the first series being paired with one element of the second series, such that one cell of one element of the first series is paired with a predetermined cell of the corresponding element of the second series, each pair of cells thus constituted forming one transaction unit, and in that prior to a first transaction, all the cells of the two series (Z1, Z2) of elements are in the same predetermined logical state, and that after modification, the cells assume a second logical state different from the first, and that at the time of a transaction modifying the state of one cell of one element of one of the series and leaving the state of the corresponding cell of the corresponding element of the other series in its initial state to constitute a new stop in the memory, neutralizing the previous stop by modifying the state of the cell not modified at the time of the creation of said previous stop, locating the position of said previous stop by searching, starting at the position from which the placement of the new stop is calculated, for a pair of elements that are different, said step of searching being performed by comparing, in a predetermined order, each cell of an element of the first series (Z1) with the corresponding cell of an element of the second series (Z2) until a cell of an element of the first series is detected that is different from the corresponding cell of an element in the second series.

2. A method as defined by claim 1, characterized in that each element is locatable by its address (T1, T2, ..., Tn, N1, N2, ..., Nn), and that each cell of an element has a rank in this element, and that each cell of an element of the first series (Z1) is paired with the cell of the same rank in the corresponding element of the second series (Z2).

3. A method as defined by claim 2, characterized in that the balance of units comprises the number of available transaction units, that is, the pairs of cells of which the two cells are in their original state, and which are located between a first end of the zone allocated to the transactions and the stop, and that the accreditive power, that is, the number of transaction units that it is possible to use to increase the balance, comprises the number of available transaction units minus one located between the stop and the second end of the zone.

4. A method as defined by claim 3, characterized in that at the time of a transaction bearing on a debit (d) of units, after having detected the position of the previous stop, the new stop is inscribed at the (d)th transaction unit available counted from the previous stop, in the zone representing the balance, by modifying the state of the cell of this transaction unit located in the first series (Z1), and the previous stop is cancelled by modifying the state of its cell located in the second series (Z2), and that at the time of a transaction bearing on a credit of (c) units, after having detected the position of the previous stop, the new stop is created at the (c)th transaction unit available counted since the previous stop in the zone representing the accreditive power, by modifying the state of its cell located in the first series (Z1), and the previous stop is cancelled by modifying the state of the cell of the transaction unit corresponding to this previous stop, located in the second series (Z2).

5. A method as defined by claim 4, characterized in that to determine the position of the new stop and to create it at the time of a transaction, a number of unmodified cells of the second series (Z2), that is, a number corresponding to the available units, is counted from the position of the previous stop, in the zone representing the balance in the case of a debit operation, or representing the accreditive power in the case of a credit operation, and the modified cells of the second series, that is, those corresponding to the cancelled transaction units, are ignored, and the state of the cell of the first series paired with the last cell counted in the second series is modified in order to create the new stop.

6. A method as defined by claim 5, characterized in that after the creation of a new stop at the time of an attempt at a debit or credit operation, whenever it is impossible for some reason internal to the memory to modify the state of the cell located in the second series of the previous stop in order to cancel it, which would lead to having two transaction units having the configuration of a stop in the memory, then it is assumed that among these two elements, the previous stop comprises a new limit to the accreditive power.

7. A method as defined by claim 6, characterized in that whenever it is impossible, for reasons internal to the memory, to modify the state of the cell of the first series corresponding to the new stop to be created, a search is made, between the position that this new stop should have occupied and the limit of the accreditive power, in the case of credit, or between the position that the new stop should have occupied and the previous stop, in the case of a debit, for the first available transaction unit of which it is possible to modify the state of the cell that it includes in the first series (Z1), and the state of this cell located in the first series is modified in such a manner as to comprise the new stop, and in order to compensate for the shifting occasioned by this dysfunction, intervention is made upon a number of available transaction units in the portion of the memory representing the balance, this number corresponding to the number of units by which the new stop has been shifted with respect to the position that it should have occupied, on the one hand by modifying the state of the cells located in the second series of said available transaction units, and on the other hand by attempting, as soon as possible after having modified the state of a cell located in the second series of each of these available transaction units, to modify the state of the corresponding cell located in the first series, in such a manner as to attempt to neutralize each of said transaction units, and that after having performed this compensation, an attempt is made to neutralize the previous stop by modifying the state of its cell located in the second zone.

8. A method as defined by claim 7, characterized in that after the creation of a new stop at the time of an attempt at a debit or credit operation, whenever it is impossible for some reason internal to the memory to modify the state of the cell located in the second series of the previous stop in order to cancel it, which would lead to having two transaction units having the configuration of a stop in the memory, then it is assumed that among these two elements, the previous stop comprises a new limit to the accreditive power.

9. A method as defined by claim 6, characterized in that whenever it is impossible, for reasons internal to the memory, to modify the state of the cell of the first series corresponding to the new stop to be created, a search is made, between the position that this new stop should have occupied and the limit of the accreditive power in the case of a credit, or between the position that the new stop should have occupied and the previous stop in the case of a debit, for the first available transaction unit of which it is possible to modify the state of the cell that it includes in the first series (Z1), and the state of said cell located in the first series is modified, in such a manner as to comprise the new stop, an attempt is made to neutralize the previous stop by modifying the state of its cell located in the second series, and finally to compensate for the shifting caused by this dysfunction, an intervention is made upon a number of available transaction units in the portion of memory representing the balance, said number corresponding to the number of units by which the new stop has been shifted with respect to the position that it should have occupied, on the one hand by modifying the state of the cells located in the second series of said available transaction units, and on the other hand by attempting as soon as possible after having modified the state of a cell located in the second series of each of these available transaction units, to modify the state of the corresponding cell located in the first series, in such a manner as to neutralize each of said transaction units.

10. A method as defined by claim 1, characterized in that the balance of units comprises the number of available transaction units, that is, the pairs of cells of which the two cells are in their original state, and which are located between a first end of the zone allocated to the transactions and the stop, and that the accreditive power, that is, the number of transaction units that it is possible to use to increase the balance, comprises the number of available transaction units minus one located between the stop and the second end of the zone.

11. A method as defined by claim 10, characterized in that at the time of a transaction bearing on a debit (d) of units, after having detected the position of the previous stop, the new stop is inscribed at the (d)th transaction unit available counted from the previous stop, in the zone representing the balance, by modifying the state of the cell of this transaction unit located in the first series (Z1), and the previous stop is cancelled by modifying the state of its cell located in the second series (Z2), and that at the time of a transaction bearing on a credit of (c) units, after having detected the position of the previous stop, the new stop is created at the (c)th transaction unit available counted since the previous stop in the zone representing the accreditive power, by modifying the state of its cell located in the first series (Z1), and the previous stop is cancelled by modifying the state of the cell of the transaction unit corresponding to this previous stop, located in the second series (Z2).

12. A method as defined by claim 11, characterized in that to determine the position of the new stop and to create it at the time of a transaction, a number of unmodified cells of the second series (Z2), that is, a number corresponding to the available units, is counted from the position of the previous stop, in the zone representing the balance in the case of a debit operation, or representing the accreditive power in the case of a credit operation, and the modified cells of the second series, that is, those corresponding to the cancelled transaction units, are ignored, and the state of the cell of the first series paired with the last cell counted in the second series is modified in order to create the new stop.

13. A method as defined by claim 12, characterized in that after the creation of a new stop at the time of an attempt at a debit or credit operation, whenever it is impossible for some reason internal to the memory to modify the state of the cell located in the second series of the previous stop in order to cancel it, which would lead to having two transaction units having the configuration of a stop in the memory, then it is assumed that among these two elements, the previous stop comprises a new limit to the accreditive power.

14. A method as defined by claim 13, characterized in that whenever it is impossible, for reasons internal to the memory, to modify the state of the cell of the first series corresponding to the new stop to be created, a search is made, between the position that this new stop should have occupied and the limit of the accreditive power, in the case of credit, or between the position that the new stop should have occupied and the previous stop, in the case of a debit, for the first available transaction unit of which it is possible to modify the state of the cell that it includes in the first series (Z1), and the state of this cell located in the first series is modified in such a manner as to comprise the new stop, and in order to compensate for the shifting occasioned by this dysfunction, intervention is made upon a number of available transaction units in the portion of the memory representing the balance, this number corresponding to the number of units by which the new stop has been shifted with respect to the position that it should have occupied, on the one hand by modifying the state of the cells located in the second series of said available transaction units, and on the other hand by attempting, as soon as possible after having modified the state of a cell located in the second series of each of these available transaction units, to modify the state of the corresponding cell located in the first series, in such a manner as to attempt to neutralize each of said transaction units, and that after having performed this compensation, an attempt is made to neutralize the previous stop by modifying the state of its cell located in the second zone.

15. A method as defined by claim 14, characterized in that after the creation of a new stop at the time of an attempt at a debit or credit operation, whenever it is impossible for some reason internal to the memory to modify the state of the cell located in the second series of the previous stop in order to cancel it, which would lead to having two transaction units having the configuration of a stop in the memory, then it is assumed that among these two elements, the previous stop comprises a new limit to the accreditive power.

16. A method as defined by claim 13, characterized in that whenever it is impossible, for reasons internal to the memory, to modify the state of the cell of the first series corresponding to the new stop to be created, a search is made, between the position that this new stop should have occupied and the limit of the accreditive power in the case of a credit, or between the position that the new stop should have occupied and the previous stop in the case of a debit, for the first available transaction unit of which it is possible to modify the state of the cell that it includes in the first series (Z1), and the state of said cell located in the first series is modified, in such a manner as to comprise the new stop, an attempt is made to neutralize the previous stop by modifying the state of its cell located in the second series, and finally to compensate for the shifting caused by this dysfunction, an intervention is made upon a number of available transaction units in the portion of memory representing the balance, said number corresponding to the number of units by which the new stop has been shifted with respect to the position that it should have occupied, on the one hand by modifying the state of the cells located in the second series of said available transaction units, and on the other hand by attempting as soon as possible after having modified the state of a cell located in the second series of each of these available transaction units, to modify the state of the corresponding cell located in the first series, in such a manner as to neutralize each of said transaction units.

17. A method as defined by claim 1, characterized in that the balance of units comprises the number of available transaction units, that is, the pairs of cells of which the two cells are in their original state, and which are located between a first end of the zone allocated to the transactions and the stop, and that the accreditive power, that is, the number of transaction units that it is possible to use to increase the balance, comprises the number of available transaction units minus one located between the stop and the second end of the zone.

18. A method as defined by claim 17, characterized in that at the time of a transaction bearing on a debit (d) of units, after having detected the position of the previous stop, the new stop is inscribed at the (d)th transaction unit available counted from the previous stop, in the zone representing the balance, by modifying the state of the cell of this transaction unit located in the first series (Z1), and the previous stop is cancelled by modifying the state of its cell located in the second series (Z2), and that at the time of a transaction bearing on a credit of (c) units, after having detected the position of the previous stop, the new stop is created at the (c)th transaction unit available counted since the previous stop in the zone representing the accreditive power, by modifying the state of its cell located in the first series (Z1), and the previous stop is cancelled by modifying the state of the cell of the transaction unit corresponding to this previous stop, located in the second series (Z2).

19. A method as defined by claim 18, characterized in that to determine the position of the new stop and to create it at the time of a transaction, a number of unmodified cells of the second series (Z2), that is, a number corresponding to the available units, is counted from the position of the previous stop, in the zone representing the balance in the case of a debit operation, or representing the accreditive power in the case of a credit operation, and the modified cells of the second series, that is, those corresponding to the cancelled transaction units, are ignored, and the state of the cell of the first series paired with the last cell counted in the second series is modified in order to create the new stop.

20. A method as defined by claim 19, characterized in that after the creation of a new stop at the time of an attempt at a debit or credit operation, whenever it is impossible for some reason internal to the memory to modify the state of the cell located in the second series of the previous stop in order to cancel it, which would lead to having two transaction units having the configuration of a stop in the memory, then it is assumed that among these two elements, the previous stop comprises a new limit to the accreditive power.

21. A method as defined by claim 20, characterized in that whenever it is impossible, for reasons internal to the memory, to modify the state of the cell of the first series corresponding to the new stop to be created, a search is made, between the position that this new stop should have occupied and the limit of the accreditive power, in the case of credit, or between the position that the new stop should have occupied and the previous stop, in the case of a debit, for the first available transaction unit of which it is possible to modify the state of the cell that it includes in the first series (Z1), and the state of this cell located in the first series is modified in such a manner as to comprise the new stop, and in order to compensate for the shifting occasioned by this dysfunction, intervention is made upon a number of available transaction units in the portion of the memory representing the balance, this number corresponding to the number of units by which the new stop has been shifted with respect to the position that it should have occupied, on the one hand by modifying the state of the cells located in the second series of said available transaction units, and on the other hand by attempting, as soon as possible after having modified the state of a cell located in the second series of each of these available transaction units, to modify the state of the corresponding cell located in the first series, in such a manner as to attempt to neutralize each of said transaction units, and that after having performed this compensation, an attempt is made to neutralize the previous stop by modifying the state of its cell located in the second zone.

22. A method as defined by claim 21, characterized in that after the creation of a new stop at the time of an attempt at a debit or credit operation, whenever it is impossible for some reason internal to the memory to modify the state of the cell located in the second series of the previous stop in order to cancel it, which would lead to having two transaction units having the configuration of a stop in the memory, then it is assumed that among these two elements, the previous stop comprises a new limit to the accreditive power.

23. A method as defined by claim 20, characterized in that whenever it is impossible, for reasons internal to the memory, to modify the state of the cell of the first series corresponding to the new stop to be created, a search is made, between the position that this new stop should have occupied and the limit of the accreditive power in the case of a credit, or between the position that the new stop should have occupied and the previous stop in the case of a debit, for the first available transaction unit of which it is possible to modify the state of the cell that it includes in the first series (Z1), and the state of said cell located in the first series is modified, in such a manner as to comprise the new stop, an attempt is made to neutralize the previous stop by modifying the state of its cell located in the second series, and finally to compensate for the shifting caused by this dysfunction, an intervention is made upon a number of available transaction units in the portion of memory representing the balance, said number corresponding to the number of units by which the new stop has been shifted with respect to the position that it should have occupied, on the one hand by modifying the state of the cells located in the second series of said available transaction units, and on the other hand by attempting as soon as possible after having modified the state of a cell located in the second series of each of these available transaction units, to modify the state of the corresponding cell located in the first series, in such a manner as to neutralize each of said transaction units.

24. A method as defined by claim 1, characterized in that at the time of a transaction bearing on a debit (d) of units, after having detected the position of the previous stop, the new stop is inscribed at the (d)th transaction unit available counted from the previous stop, in the zone representing the balance, by modifying the state of the cell of this transaction unit located in the first series (Z1), and the previous stop is cancelled by modifying the state of its cell located in the second series (Z2), and that at the time of a transaction bearing on a credit of (c) units, after having detected the position of the previous stop, the new stop is created at the (c)th transaction unit available counted since the previous stop in the zone representing the accreditive power, by modifying the state of its cell located in the first series (Z1), and the previous stop is cancelled by modifying the state of the cell of the transaction unit corresponding to this previous stop, located in the second series (Z2).

25. A method as defined by claim 24, characterized in that to determine the position of the new stop and to create it at the time of a transaction, a number of unmodified cells of the second series (Z2), that is, a number corresponding to the available units, is counted from the position of the previous stop, in the zone representing the balance in the case of a debit operation, or representing the accreditive power in the case of a credit operation, and the modified cells of the second series, that is, those corresponding to the cancelled transaction units, are ignored, and the state of the cell of the first series paired with the last cell counted in the second series is modified in order to create the new stop.

26. A method as defined by claim 25, characterized in that after the creation of a new stop at the time of an attempt at a debit or credit operation, whenever it is impossible for some reason internal to the memory to modify the state of the cell located in the second series of the previous stop in order to cancel it, which would lead to having two transaction units having the configuration of a stop in the memory, then it is assumed that among these two elements, the previous stop comprises a new limit to the accreditive power.

27. A method as defined by claim 26, characterized in that whenever it is impossible, for reasons internal to the memory, to modify the state of the cell of the first series corresponding to the new stop to be created, a search is made, between the position that this new stop should have occupied and the limit of the accreditive power, in the case of credit, or between the position that the new stop should have occupied and the previous stop, in the case of a debit, for the first available transaction unit of which it is possible to modify the state of the cell that is includes in the first series (Z1), and the state of this cell located in the first series is modified in such a manner as to comprise the new stop, and in order to compensate for the shifting occasioned by this dysfunction, intervention is made upon a number of available transaction units in the portion of the memory representing the balance, this number corresponding to the number of units by which the new stop has been shifted with respect to the position that it should have occupied, on the one hand by modifying the state of the cells located in the second series of said available transaction units, and on the other hand by attempting, as soon as possible after having modified the state of a cell located in the second series of each of these available transaction units, to modify the state of the corresponding cell located in the first series, in such a manner as to attempt to neutralize each of said transaction units, and that after having performed this compensation, an attempt is made to neutralize the previous stop by modifying the state of its cell located in the second zone.

28. A method as defined by claim 27, characterized in that to compensate for the shifting caused by the creation of a new stop at the time of an attempt at credit, an intervention is made upon a number of transaction units available in the portion of the memory representing the balance, included between the previous stop and the new stop.

29. A method as defined by claim 26, characterized in that whenever it is impossible, for reasons internal to the memory, to modify the state of the cell of the first series corresponding to the new stop to be created, a search is made, between the position that this new stop should have occupied and the limit of the accreditive power in the case of a credit, or between the position that the new stop should have occupied and the previous stop in the case of a debit, for the first available transaction unit of which it is possible to modify the state of the cell that it includes in the first series (Z1), and the state of said cell located in the first series is modified, in such a manner as to comprise the new stop, an attempt is made to neutralize the previous stop by modifying the state of its cell located in the second series, and finally to compensate for the shifting caused by this dysfunction, an intervention is made upon a number of available transaction units in the portion of memory representing the balance, said number corresponding to the number of units by which the new stop had been shifted with respect to the position that it should have occupied, on the one hand by modifying the state of the cells located in the second series of said available transaction units, and on the other hand by attempting as soon as possible after having modified the state of a cell located in the second series of each of these available transaction units, to modify the state of the corresponding cell located in the first series, in such a manner as to neutralize each of said transaction units.

30. A system for management of an electronic memory representing predetermined homogeneous units, including a microprocessor, an electronically programmable electronic memory operatively associated with said microprocessor, means for writing into said memory a stop indicating the balance at the end of a transaction bearing on a credit or debit of units, means for dividing said memory into two series (Z1, Z2) of elements of equal capacity, each series being divided into elements of the same format, each element containing a non-specific number (k) of cells (C1, C2, . . . , Ck), means for pairing each element of the first series with one element of the second series, such that one cell of one element of the first series is paired with a predetermined cell of the corresponding element of the second series, each pair of cells thus constituted forming one transaction unit, wherein prior to a first transaction, all of the cells of the two series (Z1, Z2) of elements are in the same predetermined first logical state, and that after modification, the cells assume a second logical state different from the first, means for modifying at the time of a transaction the state of one cell of one element of one of the series and leaving the state of the corresponding cell of the corresponding element of the other series in its initial state to form a stop in the memory, means for neutralizing the previously formed stop by modifying the state of the cell not modified at the time of the creation of said previous stop to constitute a new stop in the memory, means for searching for the position of said previous stop, starting at the position from which the placement of the new stop is calculated, by initially searching for the pair of elements in which said previous stop is located, and then next searching for the pair forming said previous stop in the pair of elements that are different and in which said stop has been detected, and means for allocating each element of the memory to the accounting entry of the predetermined homogeneous units includes a non-specific number of cells equivalent to the processing format of the microprocessor.

31. A system as defined by claim 30, characterized in that it further includes a processing card with an electronic memory and a microprocessor having a non-specific processing format, and that the memory of the card includes at least two identical series (Z1, Z2) of the same format, each element of the first zone (Z1) being paired with an element of the zone (Z2), and that a cell of a given rank of one of the elements is paired with the cell of the same rank of the corresponding element, each pair of cells thus constituted determining one transaction unit.

32. A system for management of an electronic memory representing predetermined homogeneous units including a microprocessor, an electronically programmable electronic memory operatively associated with said microprocessor, means for writing into said memory a stop indicating the balance at the end of a transaction bearing on a credit or debit of units, means for dividing said memory into two series (Z1, Z2) of elements of equal capacity, means for dividing each series into elements of the same format, each element containing a non-specific number (k) of cells (C1, C2, ..., Ck), means for pairing each element of the first series with one element of the second series, such that one cell of one element of the first series is paired with a predetermined cell of the corresponding element of the second series, each pair of cells thus constituted forming one transaction unit, wherein prior to a first transaction, all the cells of the two series (Z1, Z2) of elements are in the same predetermined first logical state, and that after modification, the cells assume a second logical state different from the first logical state, means for constituting, at the time of a transaction, a new stop by modifying the state of the cell of one element of one of the series and leaving the state of the corresponding cell of the corresponding element of the other series in its initial state to form a new stop in the memory, means for neutralizing the previous stop by modifying the state of the cell not modified at the time of the creation of said previous stop, means for searching for the position of said previous stop, starting at the position from which the placement of the new stop is calculated, by initially searching for the pair of elements in which said previous stop is located, and then next searching for the pair forming said previous stop in the pair of elements in which said stop has been detected, the said search for the stop being performed by successively comparing, in a predetermined order, each cell of the element of the first series (Z1) with the corresponding cell of the element of the second series (Z2) until a cell of an element of the first series is detected that is different from a corresponding cell of an element in the second series and means for allocating each element of the memory to the accounting entry of the predetermined homogeneous units includes a non-specific number of cells equivalent to the processing format of the microprocessor, each element being locatable by its address (T1, T2, ... . Tn, N1, N2, ... Nn) and each cell of an element having a rank in the element and each cell of an element of the first series (Z1) is paired with the cell of the same rank in the corresponding element of the second series.

33. A system as defined by claim 32 characterized in that the balance of units comprises the number of available transaction units, that is, the pairs of cells of which the two cells are in their original state, and which are located between a first end of the zone allocated to the transactions and the stop, and that the accreditive power, that is, the number of transaction units that it is possible to use to increase the balance, comprises the number of available transaction units minus one located between the stop and the second end of the zone.

34. A system as defined by claim 33, characterized in that it further includes a processing card with an electronic memory and a microprocessor having a non-specific processing format, and that the memory of the card includes at least two identical series (Z1, Z2) of the same format, each element of the first zone (Z1) being paired with an element of the zone (Z2), and that a cell of a given rank of one of the elements is paired with the cell of the same rank of the corresponding element, each pair of cells thus constituted determining one transaction unit.

35. A system as defined by claim 32 characterized in that at the time of a transaction bearing on a debit (d) of units, after having detected the position of the previous stop, the new stop is inscribed at the (d)th transaction unit available counted from the previous stop, in the zone representing the balance, by modifying the state of the cell of this transaction unit located in the first series (Z1), and the previous stop is cancelled by modifying the state of its cell located in the second series (Z2), and that at the time of a transaction bearing on a credit of (c) units, after having detected the position of the previous stop, the new stop is created at the (c)th transaction unit available counted since the previous stop in the zone representing the accreditive power, by modifying the state of its cell located in the first series (Z1), and the previous stop is cancelled by modifying the state of the cell of the transaction unit corresponding to this previous stop, located in the second series (Z2).

36. A system as defined by claim 35, characterized in that it further includes a processing card with an electronic memory and a microprocessor having a non-specific processing format, and that the memory of the card includes at least two identical series (Z1, Z2) of the same format, each element of the first zone (Z1) being paired with an element of the zone (Z2), and that a cell of a given rank of one of the elements is paired with the cell of the same rank of the corresponding element, each pair of cells thus constituted determining one transaction unit.

37. A system as defined by claim 32 characterized in that to determine the position of the new stop and to create it at the time of a transaction, a number of unmodified cells of the second series (Z2), that is, a number corresponding to the available units, is counted from the position of the previous stop, in the zone representing the balance in the case of a debit operation, or representing the accreditive power in the case of a credit operation, and the modified cells of the second series, that is, those corresponding to the cancelled transaction units, are ignored, and the state of the cell of the first series paired with the last cell counted in the second series is modified in order to create the new stop.

38. A system as defined by claim 37, characterized in that it further includes a processing card with an electronic memory and a microprocessor having a nonspecific processing format, and that the memory of the card includes at least two identical series (Z1, Z2) of the same format, each element of the first zone (Z1) being paired with an element of the zone (Z2), and that a cell of a given rank of one of the elements is paired with the cell of the same rank of the corresponding element, each pair of cells thus constituted determining one transaction unit.

39. A system as defined by claim 32 characterized in that after the creation of a new stop at the time of an attempt at a debit or credit operation, whenever it is impossible for some reason internal to the memory to modify the state of the cell located in the second series of the previous stop in order to cancel it, which would lead to having two transaction units having the configuration of a stop in the memory, then it is assumed that among these two elements, the previous stop comprises a new limit to the accreditive power.

40. A system as defined by claim 39, characterized in that it further includes a processing card with an electronic memory and a microprocessor having a nonspecific processing format, and that the memory of the card includes at least two identical series (Z1, Z2) of the same format, each element of the first zone (Z1) being paired with an element of the zone (Z2), and that a cell of a given rank of one of the elements is paired with the cell of the same rank of the corresponding element, each pair of cells thus constituted determining one transaction unit.

41. A system as defined by claim 32, characterized in that whenever it is impossible, for reasons internal to the memory, to modify the state of the cell of the first series corresponding to the new stop to be created, a search is made, between the position that this new stop should have occupied and the limit of the accreditive power, in the case of credit, or between the position that the new stop should have occupied and the previous stop, in the case of a debit, for the first available transaction unit of which it is possible to modify the state of the cell that it includes in the first series (Z1), and the state of this cell located in the first series is modified in such a manner as to comprise the new stop, and in order to compensate for the shifting occasioned by this dysfunction, intervention is made upon a number of available transaction units in the portion of the memory representing the balance, this number corresponding to the number of units by which the new stop has been shifted with respect to the position that it should have occupied, on the one hand by modifying the state of the cells located in the second series of said available transaction units, and on the other hand by attempting, as soon as possible after having modified the state of a cell located in the second series of each of these available transaction units, to modify the state of the corresponding cell located in the first series, in such a manner as to attempt to neutralize each of said transaction units, and that after having performed this compensation, an attempt is made to neutralize the previous stop by modifying the state of its cell located in the second zone.

42. A system as defined by claim 41, characterized in that it further includes a processing card with an electronic memory and a microprocessor having a nonspecific processing format, and that the memory of the card includes at least two identical series (Z1, Z2) of the same format, each element of the first zone (Z1) being paired with an element of the zone (Z2), and that a cell of a given rank of one of the elements is paired with the cell of the same rank of the corresponding element, each pair of cells thus constituted determining one transaction unit.

43. A system as defined by claim 32, characterized in that to compensate for the shifting caused by the creation of a new stop at the time of an attempt at credit, an intervention is made upon a number of transaction units available in the portion of the memory representing the balance, included between the previous stop and the new stop.

44. A system as defined by claim 43, characterized in that it further includes a processing card with an electronic memory and a microprocessor having a nonspecific processing format, and that the memory of the card includes at least two identical series (Z1, Z2) of the same format, each element of the first zone (Z1) being paired with an element of the zone (Z2), and that a cell of a given rank of one of the elements is paired with the cell of the same rank of the corresponding element, each pair of cells thus constituted determining one transaction unit.

45. A system as defined by claim 32, characterized in that whenever it is impossible, for reasons internal to the memory, to modify the state of the cell of the first series corresponding to the new stop to be created, a search is made, between the position that this new stop should have occupied and the limit of the accreditive power in the case of a credit, or between the position that the new stop should have occupied and the previous stop in the case of a debit, for the first available transaction unit of which it is possible to modify the state of the cell that it includes in the first series (Z1), and the state of said cell located in the first series is modified, in such a manner as to comprise the new stop, an attempt is made to neutralize the previous stop by modifying the state of its cell located in the second series, and finally to compensate for the shifting caused by this dysfunction, an intervention is made upon a number of available transaction units in the portion of memory representing the balance, said number corresponding to the number of units by which the new stop has been shifted with respect to the position that is should have occupied, on the one hand by modifying the state of the cells located in the second series of said available transaction units, and on the other hand by attempting as soon as possible after having modified the state of a cell located in the second series of each of these available transaction units, to modify the state of the corresponding cell located in the first series, in such a manner as to neutralize each of said transaction units.

46. A system as defined by claim 45, characterized in that it further includes a processing card with an electronic memory and a microprocessor having a non-specific processing format, and that the memory of the card includes at least two identical series (Z1, Z2) of the same format, each element of the first zone (Z1) being paired with an element of the zone (Z2), and that a cell of a given rank of one of the elements is paired with the cell of the same rank of the corresponding element, each pair of cells thus constituted determining one transaction unit.

47. A system as defined by claim 32, characterized in that it further includes a processing card with an electronic memory and a microprocessor having a non-specific processing format, and that the memory of the card includes at least two identical series (Z1, Z2) of the same format, each element of the first zone (Z1) being paired with an element of the zone (Z2), and that a cell of a given rank of one of the elements is paired with the cell of the same rank of the corresponding element, each pair of cells thus constituted determining one transaction unit.

48. A system as defined by claim 32, characterized in that it further includes a processing card with an electronic memory and a microprocessor having a non-specific processing format, and that the memory of the card includes at least two identical series (Z1, Z2) of the same format, each element of the first zone (Z1) being paired with an element of the zone (Z2), and that a cell of a given rank of one of the elements is paired with the cell of the same rank of the corresponding element, each pair of cells thus constituted determining one transaction unit.

49. A method for management of an electronic memory representing predetermined homogeneous units, comprising writing a stop into the memory to indicate the balance at the end of a transaction hearing on a credit or debit of units, dividing the memory into two series (Z1, Z2) of elements of equal capacity, each series being divided into elements of the same format, each element containing a non-specific number (k) of cells (C1, C2, ..., Ck), each element of the first series being paired with one element of the second series, such that one cell of one element of the first series is paired with a predetermined cell of the corresponding element of the second series, each pair of cells thus constituted forming one transaction unit, at the time of a transaction, modifying the state of one cell of one element of one of the series and leaving the state of the corresponding cell of the corresponding element of the other series in its initial state to constitute a new stop, neutralizing the previous stop by modifying the state of the cell not modified at the time of the creation of this previous stop, and searching for the position of said previous stop, starting at the position from which the placement of the new stop is calculated, by initially seeking the pair of elements in which this previous stop is located, and then next seeking the pair forming this previous stop in the pair of elements in which it has been detected.

50. A method as defined by claim 49, characterized in that each element is locatable by its address (T1, T2, ..., Tn, N1, N2, ..., Nn), and that each cell of an element has a rank in this element, and that each cell of an element of the first series (Z1) is paired with the cell of the same rank in the corresponding element of the second series (Z2).

51. A method as defined by claim 50, characterized in that the balance of units comprises the number of available transaction units, that is, the pairs of cells of which the two cells are in their original state, and which are located between a first end of the zone allocated to the transactions and the stop, and that the accreditive power, that is, the number of transaction units that it is possible to use to increase the balance, comprises the number of available transaction units minus one located between the stop and the second end of the zone.

52. A method as defined by claim 51, characterized in that at the time of a transaction bearing on a debit (d) of units, after having detected the position of the previous stop, the new stop is inscribed at the (d)th transaction unit available counted from the previous stop, in the zone representing the balance, by modifying the state of the cell of this transaction unit located in the first series (Z1), and the previous stop is cancelled by modifying the state of its cell located in the second series (Z2), and that at the time of a transaction bearing on a credit of (c) units, after having detected the position of the previous stop, the new stop is created at the (c)th transaction unit available counted since the previous stop in the zone representing the accreditive power, by modifying the state of its cell located in the first series (Z1), and the previous stop is cancelled by modifying the state of the cell of the transaction unit corresponding to this previous stop, located in the second series (Z2).

53. A method as defined by claim 52, characterized in that to determine the position of the new stop and to create it at the time of a transaction, a number of unmodified cells of the second series (Z2), that is, a number corresponding to the available units, is counted from the position of the previous stop, in the zone representing the balance in the case of a debit operation, or representing the accreditive power in the case of a credit operation, and the modified cells of the second series, that is, those corresponding to the cancelled transaction units, are ignored, and the state of the cell of the first series paired with the last cell counted in the second series is modified in order to create the new stop.

54. A method as defined by claim 49, characterized in that the balance of units comprises the number of available transaction units, that is, the pairs of cells of which the two cells are in their original state, and which are located between a first end of the zone allocated to the transactions and the stop, and that the accreditive power, that is, the number of transaction units that it is possible to use to increase the balance, comprises the number of available transaction units minus one located between the stop and the second end of the zone.

55. A method as defined by claim 54, characterized in that at the time of a transaction bearing on a debit (d) of units, after having detected the position of the previous stop, the new stop is inscribed at the (d)th transaction unit available counted from the previous stop, in the zone representing the balance, by modifying the state of the cell of this transaction unit located in the first series (Z1), and the previous stop is cancelled by modifying the state of its cell located in the second series (Z2), and that at the time of a transaction bearing on a credit of (c) units, after having detected the position of the previous stop, the new stop is created at the (c)th transaction unit available counted since the previous stop in the zone representing the accreditive power, by modifying the state of its cell located in the first series (Z1), and the previous stop is cancelled by modifying the state of the cell of the transaction unit corresponding to this previous stop, located in the second series (Z2).

56. A method as defined by claim 55, characterized in that to determine the position of the new stop and to create it at the time of a transaction, a number of unmodified cells of the second series (Z2), that is, a number corresponding to the available units, is counted from the position of the previous stop, in the zone representing the balance in the case of a debit operation, or representing the accreditive power in the case of a credit operation, and the modified cells of the second series, that is, those corresponding to the cancelled transaction units, are ignored, and the state of the cell of the first series paired with the last cell counted in the second series is modified in order to create the new stop.

57. A system for management of an electronic memory representing predetermined homogeneous units including a microprocessor, an electronically programmable electronic memory operatively associated with said microprocessor, means for writing into said memory a stop indicating the balance at the end of a transaction bearing on a credit or debit of units, means for dividing said memory into two series (Z1, Z2) of elements of equal capacity, means for dividing each series into elements of the same format, each element containing a non-specific number (k) of cells (C1, C2, ..., Ck), means for pairing each element of the first series with one element of the second series, such that one cell of one element of the first series is paired with a predetermined cell of the corresponding element of the second series, each pair of cells thus constituted forming one transaction unit, means for constituting at the time of a transaction, on the one hand, a new stop by modifying the state of one cell of one element of one of the series and leaving the state of the corresponding cell of the corresponding element of the other series in its initial state, and on the other hand, neutralizing the previous stop by modifying the state of the cell not modified at the time of the creation of this previous stop, means for searching for the position of said previous stop, starting at the position from which the placement of the new stop is calculated, by initially seeking the pair of elements in which this previous stop is located, and then next seeking the pair forming this previous stop in the pair of elements in which it has been detected, and means for allocating each element of the memory to the accounting entry of the predetermined homogeneous units include a non-specific number of cells equivalent to the processing format of the microprocessor, each element being locatable by its address (T1, T2, .... Tn, N1, N2, ... Nm) each cell of an element having a rank in the element and each cell of an element of the first series (Z1) is paired with the cell of the same rank in the corresponding element of the second series, and the balance of units comprises the number of available transaction units, that is, the pairs of cells of which the two cells are in their original state, and which are located between a first end of the zone allocated to the transactions and the stop, and that the accreditive power, that is, the number of transaction units that it is possible to use to increase the balance, comprises the number of available transaction units minus one located between the stop and the second end of the zone.

58. A system as defined by claim 57 characterized in that at the time of a transaction bearing on a debit (d) of units, after having detected the position of the previous stop, the new stop is inscribed at the (d)th transaction unit available counted from the previous stop, in the zone representing the balance, by modifying the state of the cell of this transaction unit located in the first series (Z1), and the previous stop is cancelled by modifying the state of its cell located in the second series (Z2), and that at the time of a transaction bearing on a credit of (c) units, after having detected the position of the previous stop, the new stop is created at the (c)th transaction unit available counted since the previous stop in the zone representing the accreditive power, by modifying the state of its cell located in the first series (Z1), and the previous stop is cancelled by modifying the state of the cell of the transaction unit corresponding to this previous stop, located in the second series (Z2).

59. A system as defined by claim 57 characterized in that to determine the position of the new stop and to create it at the time of a transaction, a number of unmodified cells of the second series (Z2), that is, a number corresponding to the available units, is counted from the position of the previous stop, in the zone representing the balance in the case of a debit operation, or representing the accreditive power in the case of a credit operation, and the modified cells of the second series, that is, those corresponding to the cancelled transaction units, are ignored, and the state of the cell of the first series paired with the last cell counted in the second series is modified in order to create the new stop.

* * * * *

UNITED STATES PATENT AND TRADEMARK OFFICE
CERTIFICATE OF CORRECTION

PATENT NO. : 5,089,959

DATED : February 18, 1992

INVENTOR(S) : Michel Hazard

It is certified that error appears in the above-identified patent and that said Letters Patent is hereby corrected as shown below:

Col. 31, claim 49, line 4 "hearing" should be --bearing--.

Signed and Sealed this

Twenty-first Day of December, 1993

BRUCE LEHMAN

*Attest:*

*Attesting Officer*  Commissioner of Patents and Trademarks